United States Patent
Matsumoto et al.

(10) Patent No.: US 7,173,607 B2
(45) Date of Patent: Feb. 6, 2007

(54) SIGNAL DETECTOR

(75) Inventors: Shoichiro Matsumoto, Ogaki (JP); Ryoichi Yokoyama, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 369 days.

(21) Appl. No.: 10/061,311

(22) Filed: Feb. 4, 2002

(65) Prior Publication Data
US 2004/0189611 A1  Sep. 30, 2004

(30) Foreign Application Priority Data
Feb. 9, 2001  (JP) .............................. 2001-033142

(51) Int. Cl.
G09G 5/00  (2006.01)
(52) U.S. Cl. ...................................... 345/173; 382/312
(58) Field of Classification Search .................. 345/98, 345/100, 173–183, 103, 204; 382/120–123, 382/312–324
See application file for complete search history.

(56) References Cited

U.S. PATENT DOCUMENTS

| | | | | |
|---|---|---|---|---|
| 4,782,340 A * | 11/1988 | Czubatyj et al. | .............. | 345/92 |
| 5,307,085 A * | 4/1994 | Nakamura | .................... | 345/99 |
| 5,528,267 A * | 6/1996 | Ise | ............................. | 345/174 |
| 5,568,163 A * | 10/1996 | Okumura | ..................... | 345/100 |
| 5,610,629 A * | 3/1997 | Baur | ........................... | 345/104 |
| 5,657,040 A * | 8/1997 | Kanbara | ....................... | 345/98 |
| 5,682,177 A * | 10/1997 | Kuwata et al. | .............. | 345/100 |
| 5,877,715 A * | 3/1999 | Gowda et al. | .............. | 341/122 |
| 5,982,347 A * | 11/1999 | Shigeta et al. | ................. | 345/88 |
| 6,049,321 A * | 4/2000 | Sasaki | .......................... | 345/99 |
| 6,239,788 B1 * | 5/2001 | Nohno et al. | ................ | 345/173 |
| 6,259,504 B1 * | 7/2001 | Shin et al. | ................... | 349/144 |
| 6,618,032 B1 * | 9/2003 | Seino | .......................... | 345/89 |
| 6,670,953 B1 * | 12/2003 | Ozawa | ........................ | 345/211 |
| 6,700,562 B1 * | 3/2004 | Knapp et al. | ................. | 345/98 |

FOREIGN PATENT DOCUMENTS

| | | |
|---|---|---|
| JP | 57-52089 | 3/1982 |
| JP | 6-62175 | 3/1994 |
| JP | 6-288845 | 10/1994 |
| JP | 6-288846 | 10/1994 |
| JP | 8-68704 | 3/1996 |
| JP | 10-063418 | 3/1998 |
| JP | 11-175037 | 7/1999 |
| JP | 2000-068837 | 3/2000 |

* cited by examiner

*Primary Examiner*—Richard Hjerpe
*Assistant Examiner*—Kevin M. Nguyen
(74) *Attorney, Agent, or Firm*—McDermott Will & Emery LLP (57) ABSTRACT

A signal detector capable of linearly reading data at a high speed is obtained. This signal detector comprises a plurality of signal transfer transistors arranged in the form of a matrix, signal detection means connected to a first terminal of each signal transfer transistor, a data line connected to a second terminal of each signal transfer transistor, a control line connected to the gate of each signal transfer transistor, a gate line driving circuit for driving the control line, data read lines connected to a plurality of prescribed data lines through switching transistors respectively, and a switch driving circuit for driving the switching transistors corresponding to the aforementioned plurality of prescribed data lines substantially at the same timing. Thus, a plurality of prescribed data are simultaneously read for enabling linear data reading and increasing the speed of data reading.

21 Claims, 9 Drawing Sheets

SIGNAL DETECTOR

BACKGROUND OF THE INVENTION

1. Field of the Invention

The present invention relates to a signal detector, and more specifically, it relates to a signal detector such as a surface pressure input panel detecting a surface pressure or a two-dimensional image sensor.

2. Description of the Prior Art

An active matrix surface pressure input panel for detecting fine pressure distribution such as that of a finger pattern with a thin-film transistor or a thin-film diode is known as an exemplary signal detector. A two-dimensional image sensor for reading a two-dimensional image with a photo-receiving sensor element is also known as another exemplary signal detector. For example, Japanese Patent Laying-Open No. 6-62175 (1994) discloses such a two-dimensional image sensor.

Figure 9:
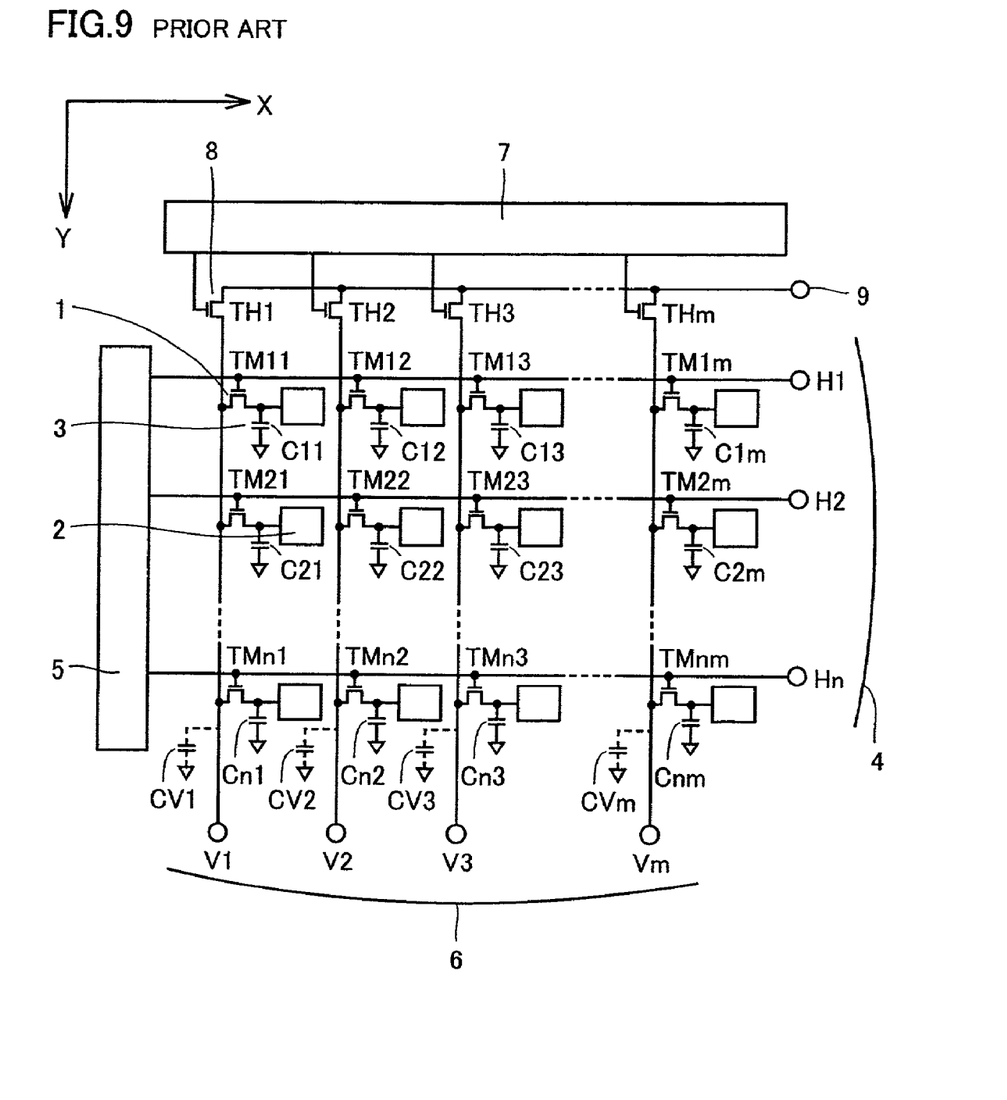
FIG. 9 is a block diagram showing the circuit structure of a conventional two-dimensional image sensor (signal detector).

FIG. 9 is a block diagram showing the circuit structure of the conventional two-dimensional image sensor disclosed in the aforementioned gazette. Referring to FIG. 9, pixels are arranged in the form of a matrix in the conventional two-dimensional image sensor. Each pixel is formed by a pixel switch (TM11 to TMnm) 1 consisting of an amorphous silicon TFT, an amorphous silicon thin-film photosensor 2 serving as an optical sensor and a storage capacitor (C11 to Cnm) 3.

A gate electrode of the pixel switch 1 is connected to a subscanning line (Hi: i=1 to n) 4 extending in a main scanning direction (X-direction). A subscanning circuit 5 applies a pulse voltage for successively turning on the pixel switch 1 to each subscanning line 4. A drain electrode of the pixel switch 1 is connected to a main scanning line (Vi: i=1 to m) 6 extending in a subscanning direction (Y-direction). The main scanning line 6 is connected to a horizontal switching transistor (THi: i=1 to m) 8 driven by a main scanning circuit 7. A drain electrode of the horizontal switching transistor 8 is connected to a common output line 9. The main scanning lines V1 to Vm have capacitances CV1 to CVm respectively.

In order to detect data in high precision, the conventional two-dimensional image sensor (signal detector) shown in FIG. 9 must increase the number of pixels by refining the respective pixels. When the number of the pixels is increased, however, peripheral circuits such as the main scanning circuit 7 and the subscanning circuit 5 driving the main scanning lines 6 and the subscanning lines 4 respectively are also increased in size. Therefore, the layout area for the peripheral circuits is disadvantageously increased while the yield is reduced in the peripheral circuit part.

Further, the conventional two-dimensional image sensor (signal detector) shown in FIG. 9 has only the single output line (signal read line) 9, and hence the reading time for fetching all data is disadvantageously increased when the number of the pixels is increased.

SUMMARY OF THE INVENTION

An object of the present invention is to provide a signal detector capable of improving the data reading speed.

Another object of the present invention is to provide a signal detector capable of reducing the number of elements forming peripheral circuits.

Still another object of the present invention is to reduce power consumption in the aforementioned signal detector.

A signal detector according to a first aspect of the present invention comprises a plurality of signal transfer transistors arranged in the form of a matrix, signal detection means connected to a first terminal of each signal transfer transistor, a data line connected to a second terminal of each signal transfer transistor, a control line connected to a control terminal of each signal transfer transistor, a control line driving circuit for driving the control line, data read lines connected to a plurality of prescribed data lines through switching transistors respectively and a switch driving circuit for driving the switching transistors corresponding to the plurality of prescribed data lines substantially at the same timing.

The signal detector according to the first aspect, provided with the switch driving circuit for driving the switching transistors corresponding to the plurality of prescribed data lines substantially at the same timing as described above, can simultaneously read a plurality of prescribed data. Thus, linear data reading is enabled and the data reading speed can be increased. Consequently, it is possible to readily cope with increase of the number of the signal transfer transistors and the signal detection means (size increase of a detection part). When reading data in a reading time similar to that in the prior art, the internal operation can be retarded and hence power consumption can be reduced.

In the signal detector according to the aforementioned first aspect, a single switch driving circuit is preferably provided for the plurality of prescribed data lines. According to this structure, a plurality of prescribed data can be readily simultaneously read while the number of elements necessary for a peripheral circuit can be reduced. Thus, the layout area for the peripheral circuit can be reduced while increasing the data reading speed, and the yield in the peripheral circuit part can be improved. The number of elements necessary for the peripheral circuit can be reduced, whereby a detection area including the signal transfer transistors and the signal detection means can be increased in size, so that data can be definitely and precisely detected. In this case, a single switch driving circuit may be provided for four or nine data lines.

In the aforementioned structure provided with the single switch driving circuit for the plurality of prescribed data lines, a single control line driving circuit is preferably provided for a plurality of control lines. According to this structure, the single control line driving circuit provided for the plurality of control lines and the single switch driving circuit provided for the plurality of data lines enable planar data reading. In this case, a single switch driving circuit may be provided for four data lines, and a single control line driving circuit may be provided for two control lines. Alternatively, a single switch driving circuit may be provided for nine data lines, and a single control line driving circuit may be provided for three control lines. In the aforementioned case, the signal detector preferably simultaneously commissions the plurality of control lines thereby planarly reading data. According to this structure, detected information can be planarly processed.

The signal detector according to the aforementioned first aspect preferably reads data from the signal detection means in a time-division system employing a pulse output from the switch driving circuit. According to this structure, data can be readily read also when a single switch driving circuit is provided for a plurality of data lines.

In the signal detector according to the aforementioned first aspect, the switch driving circuit may include two shift registers, a NAND circuit and an inverter. Further, the control line driving circuit may include a shift register.

In the signal detector according to the aforementioned first aspect, the signal transfer transistors and the switching transistors preferably consist of polysilicon thin-film transistors. When the polysilicon thin-film transistors fabricative at a low cost are employed, the fabrication cost for the signal detector can be reduced.

In the signal detector according to the aforementioned first aspect, the signal transfer transistors and the switching transistors may consist of thin-film transistors made of an organic material or a composite material of an organic material and an inorganic material.

In the signal detector according to the aforementioned first aspect, the signal detection means may include a pressure sensitive film, and the signal detection means may include a photo-receiving sensor element.

In the signal detector according to the aforementioned first aspect, the plurality of signal transfer transistors, the signal detection means, the control line driving circuit and the switch driving circuit are preferably provided on a common substrate. When the signal transfer transistors, the signal detection means, the control line driving circuit and the switch driving circuit are formed on a common substrate, no driving signal may be externally fetched and hence no electrode for external connection may be provided on the substrate. Thus, an electrode area of the substrate can be eliminated, whereby the detection area including the signal transfer transistors and the signal detection means can be more increased (in size) in addition to the aforementioned reduction of the number of elements forming the peripheral circuit. Consequently, data can be more definitely and precisely detected. No driving signal may be externally fetched through an electrode, whereby a step of externally connecting an electrode can be eliminated and the fabrication steps can consequently be shortened. Further, reduction of the assembly yield resulting from the step of externally connecting the electrode can be prevented.

In this case, a comparator for comparing read data with stored data is also formed on the common substrate. According to this structure, match/mismatch of the read data and data stored in an external IC can be detected on the substrate, whereby an interface with the external IC can be simplified.

In the signal detector according to the aforementioned first aspect, the plurality of control lines preferably include a first control line and a second control line, a plurality of data lines preferably include a first data line and a second data line, a plurality of signal detection means preferably include first signal detection means coupled with the first control line and the first data line and second signal detection means coupled with the second control line and the second data line, and the plurality of data read lines preferably include a first data read line connected to the first data line and a second data read line connected to the second data line and the switch driving circuit preferably includes a first switch driving circuit connected to the first data line and the second data line in common, for simultaneously commissioning the first control line and the second control line while commissioning the first switch driving circuit thereby simultaneously reading data of the first signal detection means coupled with the first control line and data of the second signal detection means coupled with the second control line through the first data read line and the second data read line. According to this structure, the data of the first signal detection means coupled with the first control line and the data of the second signal detection means coupled with the second control line can be readily simultaneously read through the first switch driving circuit, the first data read line and the second data read line. Thus, planar data reading is enabled.

In the signal detector according to the aforementioned first aspect, the control line preferably includes a first control line, a plurality of data lines preferably include a first data line and a second data line, the plurality of signal detection means preferably include first signal detection means and second signal detection means coupled with the first control line, the plurality of data read lines preferably include a first data read line connected to the first data line and a second data read line connected to the second data line, and the switch driving circuit preferably includes a first switch driving circuit connected to the first data line and the second data line in common, for commissioning the first control line and the first switch driving circuit thereby simultaneously reading data of the first signal detection means and the second signal detection means coupled with the first control line through the first data read line and the second data read line. According to this structure, data of first and second signal transfer transistors connected to the first control line can be readily simultaneously read through the first switch driving circuit and the first and second data read lines. Thus, linear data reading is enabled.

A signal detector according to a second aspect of the present invention comprises a plurality of transfer transistors arranged in the form of a matrix, means connected to the source of each transfer transistor for detecting the pressure of a surface, a data line connected to the drain of each transfer transistor, a gate line connected to the gate of each transfer transistor, a gate line driving circuit for driving the gate line, data read lines connected to a plurality of prescribed data lines through switching transistors respectively and a single switch driving circuit provided for the plurality of prescribed data lines for driving the gates of the switching transistors.

The signal detector according to the second aspect provided with the single switch driving circuit for the plurality of prescribed data lines can reduce the number of elements necessary for a peripheral circuit. Thus, the layout area can be reduced while the yield in the peripheral circuit part can be improved. The number of the elements necessary for the peripheral circuit can be reduced, whereby a detection area including the transfer transistors and the means detecting the pressure of the surface can be increased in size so that surface pressure data can be definitely and precisely detected. The single switch driving circuit is provided for the plurality of data lines, whereby surface pressure data can be linearly read. The plurality of data read lines are so provided that a plurality of surface pressure data can be simultaneously read. Thus, the data reading speed can be increased and it is possible to readily cope with increase of the number of the transfer transistors (size increase of a detection part). When reading data in a reading time similar to that in the prior art, the internal operation can be retarded, whereby power consumption can be reduced. In this case, the means detecting the pressure of a surface preferably includes a pressure sensitive film.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings. In each of the following embodiments, the signal detector according to the present invention is applied to an active matrix surface pressure input panel.

First Embodiment

First, the circuit structure of a surface pressure input panel according to a first embodiment of the present invention is described with reference to FIGS. 1 and 2. According to the first embodiment, detection parts detecting the pressure of a surface (hereinafter referred to as "detection parts") D11, D12, D13, D14, . . . , D21, D22, D23, . . . are arranged in the form of a matrix. As shown in FIG. 2, the detection part D11 includes a pressure sensitive film 9 serving as exemplary means for detecting the pressure of a surface and a transfer transistor 8 consisting of an N-channel polysilicon thin-film transistor (TFT) for transferring the surface pressure detected by the pressure sensitive film 9 to a data line DL1. The transfer transistor 8 has a gate connected with a gate line GL1 and a drain connected with the data line DL1. The pressure sensitive film 9 is connected to the source of the transfer transistor 8.

The source, the drain and the gate of the transfer transistor 8 are examples of "the first terminal, the second terminal and the control terminal of the signal transfer transistor" according to the present invention respectively.

Figure 1:
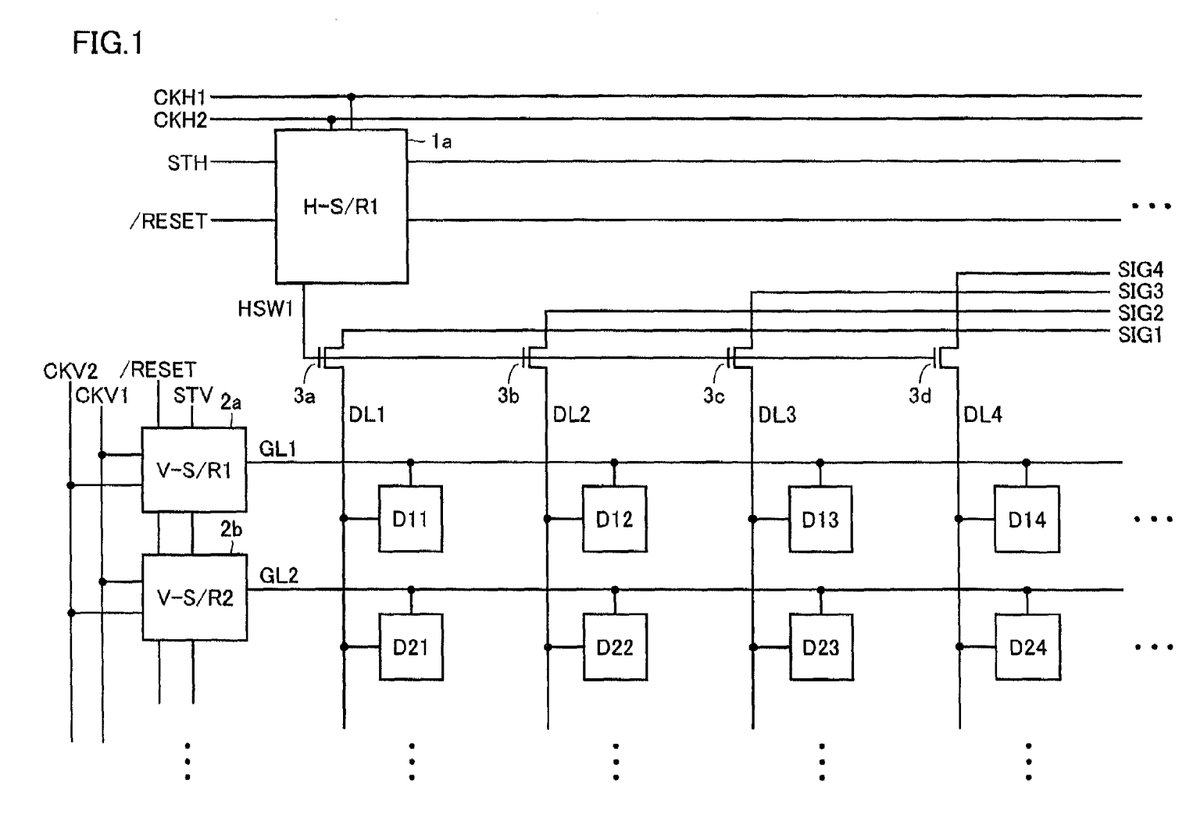
FIG. 1 is a block diagram showing the circuit structure of an active matrix surface pressure input panel according to a first embodiment of the present invention.
Figure 2:
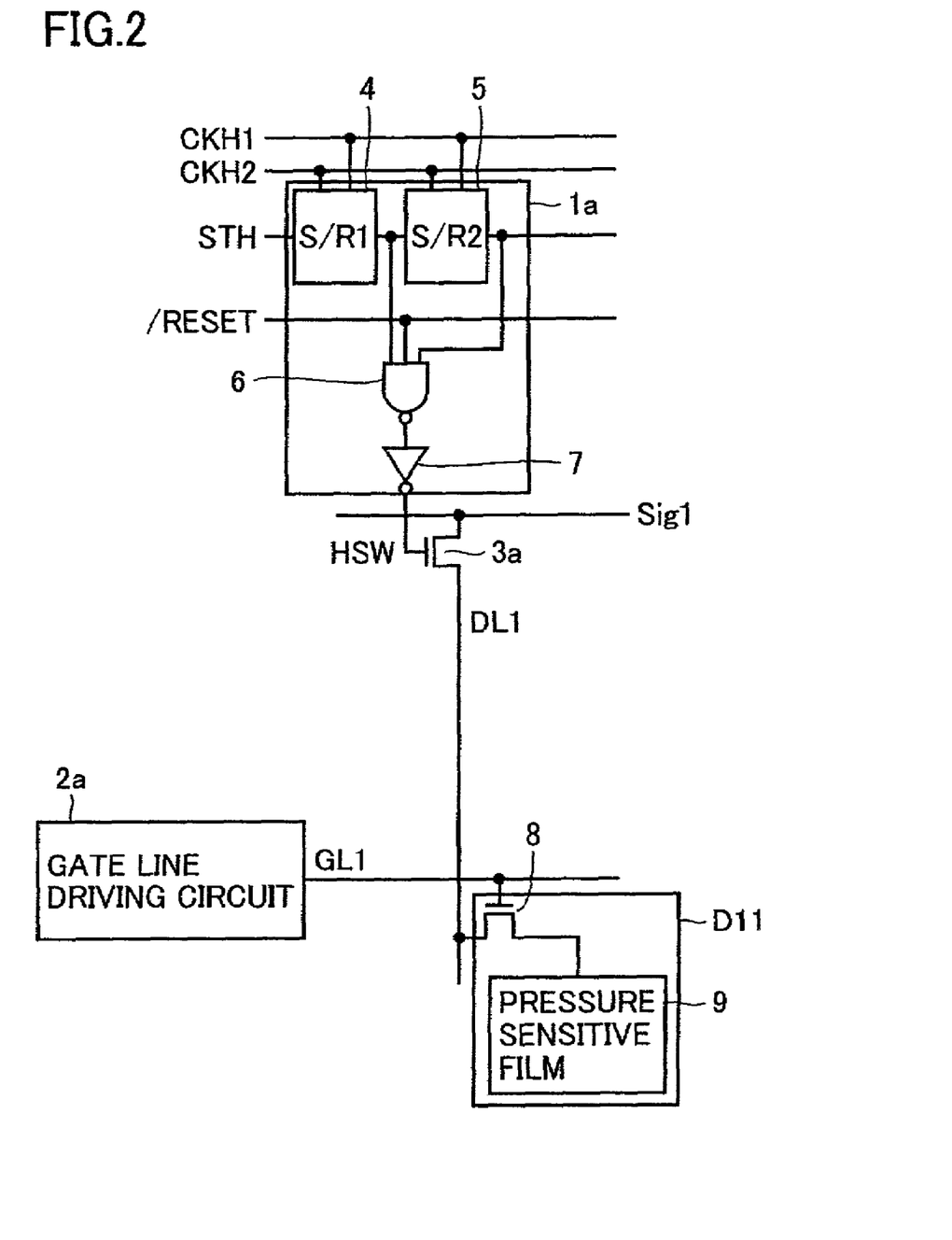
FIG. 2 is a circuit diagram showing the internal structures of an H switch driving circuit and a detection part in the surface pressure input panel according to the first embodiment shown in FIG. 1.

As shown in FIG. 1, data read lines SIG1, SIG2, SIG3 and SIG4 are connected to data lines DL1, DL2, DL3 and DL4 through switching transistors 3a, 3b, 3c and 3d consisting of N-channel polysilicon TFTs respectively. An H switch driving circuit 1a serving as an exemplary switch driving circuit is connected to the gates of the switching transistors 3a, 3b, 3c and 3d in common. The H switch driving circuit 1a includes two shift registers 4 and 5, a NAND circuit 6 and an inverter 7, as shown in FIG. 2.

A gate line driving circuit 2a consisting of a shift register V-S/R1 is connected to the gate line GL1, and a gate line driving circuit 2b consisting of a shift register V-S/R2 is connected to a gate line GL2. Similarly, a single gate line driving circuit is connected to each gate line. The gate line GL1 is an example of the "control line" according to the present invention, and the gate line driving circuits 2a and 2b are examples of the "control line driving circuit" according to the present invention.

External clocks CKH1 and CKH2, a start signal STH and a reset signal /RESET are input in the H switch driving circuit 1a. External clocks CKV1 and CKV2, a start signal STV and the reset signal /RESET are input in the gate line driving circuits 2a and 2b.

As hereinabove described, the single H switch driving circuit 1a is provided for the four data lines DL1 to DL4 in the surface pressure input panel according to the first embodiment. Further, a fifth data line DL5 (not shown) is connected to the first data read line SIG1, a sixth data line DL6 (not shown) is connected to the second data read line SIG2, a seventh data line DL7 (not shown) is connected to the third data read line SIG3, and an eighth data line DL8 (not shown) is connected to the fourth data read line SIG4. A second H switch driving circuit 1b (not shown) is connected to the fifth to eighth data lines DL5 to DL8 in common. Similarly, four data lines are successively connected to the four data read lines SIG1 to SIG4, while a single H switch driving circuit is provided for four data lines.

Figure 3:
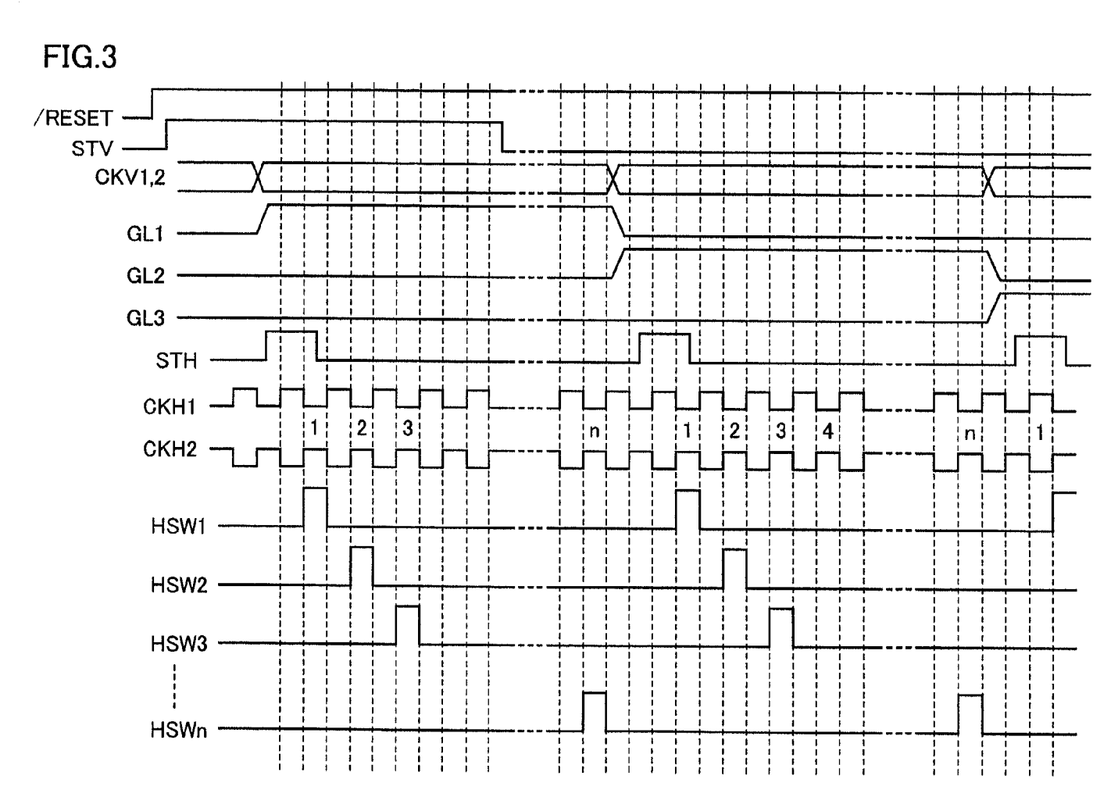
FIG. 3 is a timing chart for illustrating operations of the active matrix surface pressure input panel according to the first embodiment shown in FIG. 1.

Operations of the surface pressure input panel according to the first embodiment having the aforementioned structure are now described with reference to FIGS. 1 to 3.

First, the reset signal /RESET goes high to release the overall panel from a reset state. Then, the start signal STV for the gate line driving circuit 2a goes high thereby activating the gate line driving circuit 2a. Thus, the gate line GL1 shown in FIG. 1 rises. Following this rise of the gate line GL1, the transfer transistor 8 arranged on the detection part D11 is turned on. Thus, data of the four detection parts D11, D12, D13 and D14 connected to the gate line GL1 are transferred to the data lines DL1, DL2, DL3 and DL4 respectively.

Then, the start signal STH for the H switch driving circuit 1a goes high, whereby the external clocks CKH1 and CKH2 activate the shift registers 4 and 5 (see FIG. 2). Consequently, an output signal HSW1 goes high when three signals, i.e., the reset signal /RESET and the output signals from the shift registers 4 and 5 go high. Thus, the switching transistors 3a, 3b and 3c consisting of N-channel TFTs are activated. Consequently, the data lines DL1, DL2, DL3 and DL4 and the data read lines SIG1, SIG2, SIG3 and SIG4 are connected with each other respectively. Thus, data are output from the detection parts D111, D12, D13 and D14 to an external IC.

Thereafter the second H switch driving circuit 1b (not shown) is activated and an output signal HSW2 from this second H switch driving circuit 1b goes high. Thus, the fifth to eighth data lines DL5, DL6, DL7 and DL8 and the data read lines SIG1, SIG2, SIG3 and SIG4 are connected with each other respectively so that data are output from fifth to eighth detection parts D15, D16, D17 and D18 coupled with the gate line GL1 to the external IC. Thereafter quadruple data are sequentially read from detection parts D19, D20, . . . coupled with the gate line GL1. Thus, the surface pressure input panel according to the first embodiment reads data from the detection parts in a time-division system employing pulse signals (HSW) output from the H switch driving circuits.

When the last pulse signal HSWn is turned on for outputting data of the last detection part D1n coupled with the gate line GL1 to the corresponding data read line, the subsequent gate line GL2 rises to repeat a read operation similar to the aforementioned read operation.

According to the first embodiment, the single H switch driving circuit 1a is provided for the four data lines DL1 to DL4 as hereinabove described, whereby the number of elements necessary for peripheral circuits (the H switch driving circuits) can be reduced. Thus, the layout area for the peripheral circuits can be reduced, and the yield in the peripheral circuit part can be improved. The number of the elements necessary for the peripheral circuits can be reduced, whereby the detection parts can be increased in size for precisely and definitely detecting data. The single H switch driving circuit 1a is provided for the plurality of (four in the first embodiment) data lines DL1 to DL4, thereby enabling linear data reading.

According to the first embodiment provided with the four data read lines SIG1 to SIG4, four data can be simultaneously read. Thus, the data reading speed can be increased and it is possible to readily cope also when the number of the detection parts is increased. When reading data in a reading time similar to that in the prior art, the internal operation can be regarded and hence power consumption can be reduced.

The surface pressure input panel according to the first embodiment reads data from a signal detection part in the time-division system employing the pulse HSW1 output from the H switch driving circuit 1a as hereinabove described, whereby data can be readily read also when the single H switch driving circuit 1a is provided for the four data lines DL1 to DL4.

According to the first embodiment, further, the transfer transistor 8 forming the detection part D11 and the switching transistors 3a to 3d are formed by polysilicon TFTs fabricative at a low cost, whereby the fabrication cost for the surface pressure input panel can be reduced.

Second Embodiment

Figure 4:
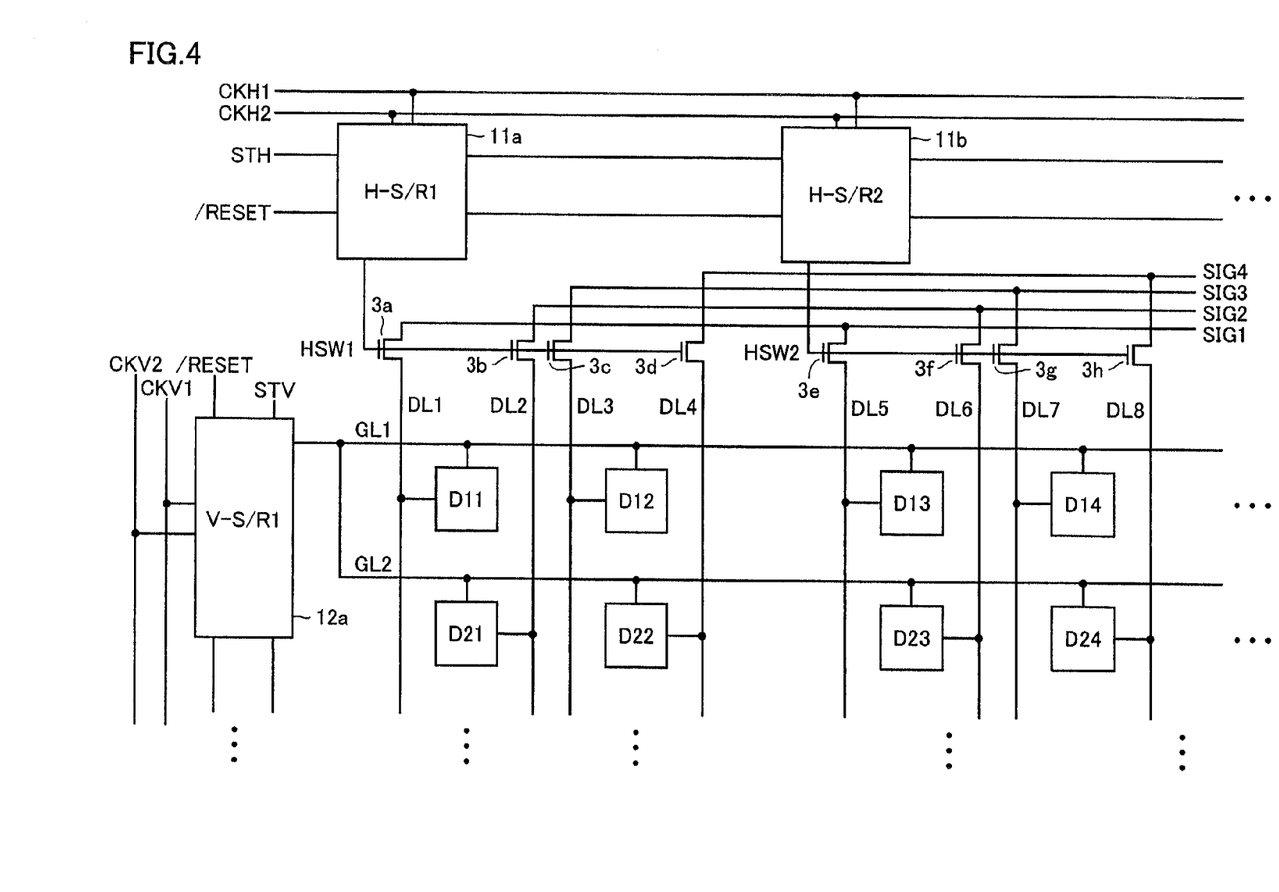
FIG. 4 is a block diagram showing the circuit structure of an active matrix surface pressure input panel according to a second embodiment of the present invention.

Referring to FIG. 4, a surface pressure input panel according to a second embodiment of the present invention has a single gate line driving circuit provided for two gate lines and a single H switch driving circuit provided for four data lines, dissimilarly to the aforementioned first embodiment. The surface pressure input panel according to the second embodiment is now described in detail.

According to the second embodiment, a common gate line driving circuit 12a is provided for gate lines GL1 and GL2, as shown in FIG. 4. Further, a single H switch driving circuit 11a is provided for first to fourth data lines DL1 to DL4. A second H switch driving circuit 11b is provided for fifth to eighth data lines DL5 to DL8. The H switch driving circuits 11a and 11b are similar in internal structure to the H switch driving circuit 1a (see FIG. 2) according to the first embodiment. The gate line driving circuit 12a is also similar in internal structure to the gate line driving circuit 2a according to the first embodiment.

According to the second embodiment, a detection part D11 coupled with the first gate line GL1 is connected to the first data line DL1, and a detection part D21 coupled with the second gate line GL2 is connected to the second data line DL2. A detection part D12 coupled with the first gate line GL1 is connected to the third data line DL3, and a detection part D22 coupled with the second gate line GL2 is connected to the fourth data line DL4. Data read lines SIG1, SIG2, SIG3 and SIG4 are connected to the data lines DL1, DL2, DL3 and DL4 through switching transistors 3a, 3b, 3c and 3d respectively.

The data read lines SIG1, SIG2, SIG3 and SIG4 are connected to the fifth to eighth data lines DL5, DL6, DL7 and DL8 through switching transistors 3e, 3f, 3g and 3h consisting of N-channel polysilicon TFTs respectively. A detection part D13 coupled with the first gate line GL1 is connected to the fifth data line DL5, and a detection part D23 coupled with the second gate line GL2 is connected to the sixth data line DL6. A detection part D14 coupled with the first gate line GL1 is connected to the seventh data line DL7, and a detection part D24 coupled with the second gate line GL2 is connected to the eighth data line DL8.

Operations of the surface pressure input panel according to the second embodiment having the aforementioned structure are now described.

First, the gate line GL1 rises and thereafter an output signal HSW1 goes high, thereby reading data from the detection parts D11, D12, D21 and D22 on the data read lines SIG1 to SIG4 through the data lines DL1 to DL4. In this case, two data from the detection parts D11 and D12 coupled with the first gate line GL1 and two data from the detection parts D21 and D22 coupled with the second gate line GL2 are simultaneously read, whereby the data can be planarly read. While the surface pressure input panel according to the aforementioned first embodiment linearly reads data from the detection parts D11, D12, D13, D14, . . . coupled with the first gate line GL1, the surface pressure input panel according to the second embodiment can planarly read data from the detection parts coupled with the two gate lines GL1 and GL2. Thus, the second embodiment is effective for planarly processing detected information.

According to the second embodiment, a single gate line driving circuit is provided for two gate lines and a single H switch driving circuit is provided for four data lines, whereby the number of elements of peripheral circuits (gate line driving circuits) can be further reduced as compared with the first embodiment providing a single H switch driving circuit for four data lines.

Third Embodiment

Figure 5:
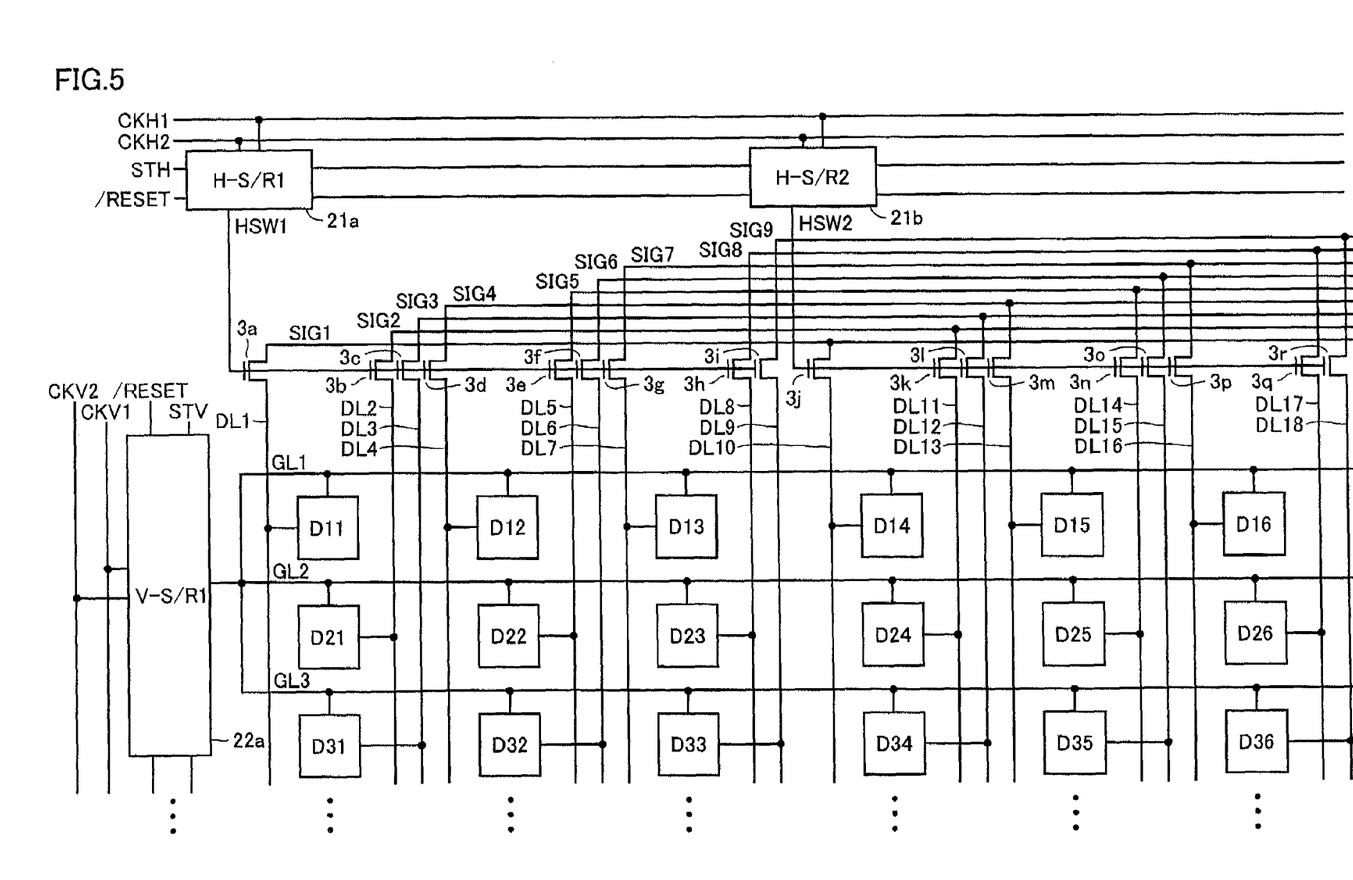
FIG. 5 is a block diagram showing the circuit structure of an active matrix surface pressure input panel according to a third embodiment of the present invention.

Referring to FIG. 5, a surface pressure input panel according to a third embodiment of the present invention has a single gate line driving circuit provided for three gate lines and a single H switch driving circuit provided for nine data lines, dissimilarly to the aforementioned first and second embodiments. The surface pressure input panel according to the third embodiment is now described in detail.

According to the third embodiment, a single gate line driving circuit 22a is connected to three gate lines GL1, GL2 and GL3 in common, as shown in FIG. 5. A single H switch driving circuit 21a is provided for nine data lines DL1 to DL9, and a single switch driving circuit 21b is provided for nine data lines DL10 to DL18. Data read lines SIG1 to SIG9 are connected to the data lines DL1 to DL9 through switching transistors 3a to 3i consisting of N-channel polysilicon TFTs respectively. The data read lines SIG1 to SIG9 are connected to the data lines DL10 to DL18 through switching transistors 3j to 3r consisting of N-channel polysilicon TFTs respectively.

A detection part D11 coupled with the gate line GL1 is connected to the data line DL1, a detection part D21 coupled with the gate line GL2 is connected to the data line DL2, and a detection part D31 coupled with the gate line GL3 is connected to the data line DL3. A detection part D12 coupled with the gate line GL1 is connected to the data line DL4, a detection part D22 coupled with the gate line GL2 is connected to the data line DL5, and a detection part D32 coupled with the gate line GL3 is connected to the data line DL6. Similarly, the remaining detection parts coupled with the gate lines GL1, GL2 and GL3 are connected to the corresponding data lines respectively.

In reading, the gate lines GL1, GL2 and GL3 simultaneously rise and thereafter a signal HSW1 goes high, thereby simultaneously reading nine data from the detection parts D11, D21, D31, D12, D22, D32, D13, D23 and D33 on the data read lines SIG1 to SIG9 through the data lines DL1 to DL9. Thus, the data can be planarly read similarly to the second embodiment. Therefore, the third embodiment is also effective for planarly processing detected information. The surface pressure input panel according to the third embodiment can simultaneously read nine data, whereby the reading speed can be further improved as compared with the structure of each of the first and second embodiments simultaneously reading four data.

According to the third embodiment, a single gate line driving circuit is provided for three gate lines while a single H switch driving circuit is provided for nine data lines, whereby the number of elements of peripheral circuits can be further reduced as compared with the first and second embodiments.

Fourth Embodiment

Figure 6:
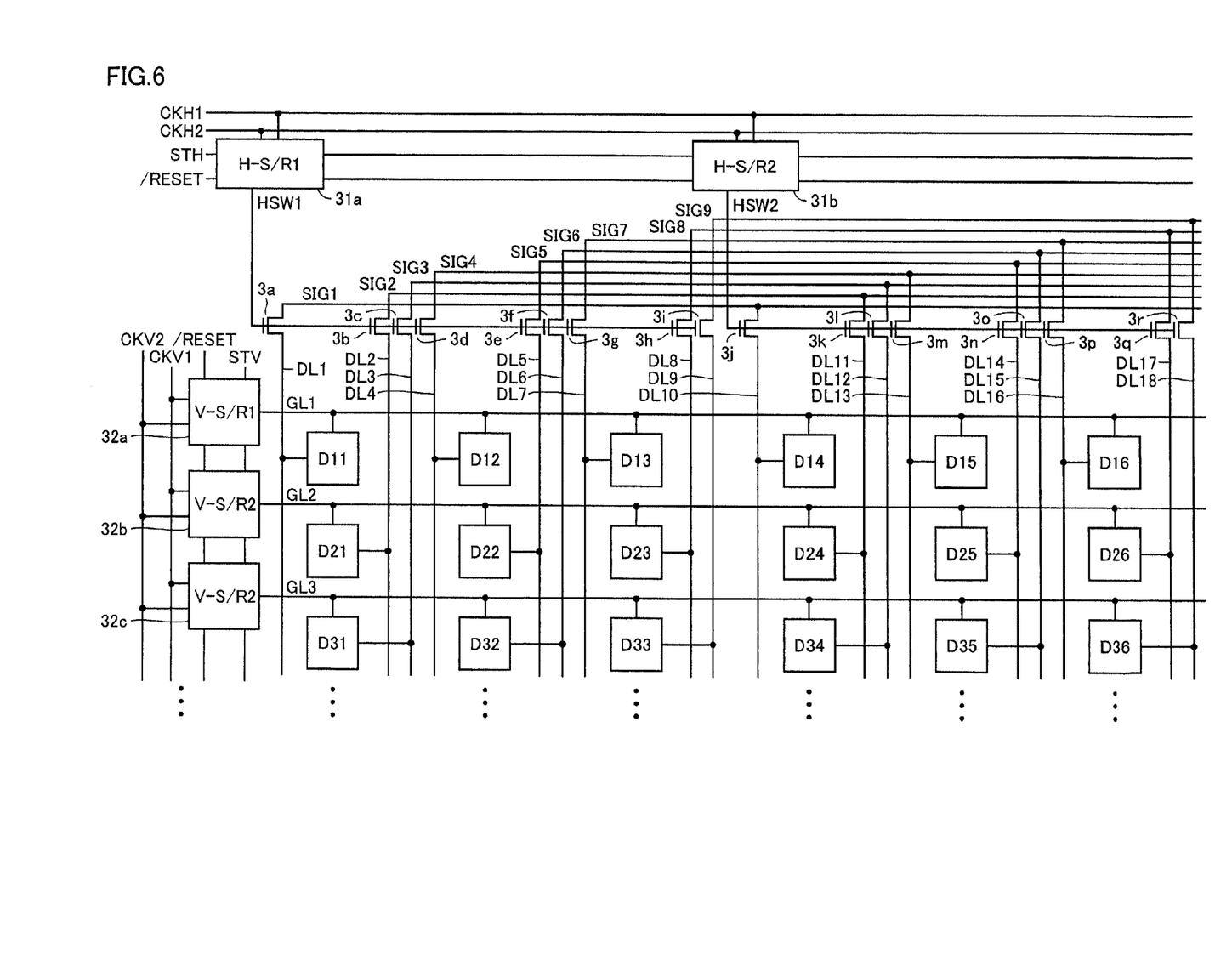
FIG. 6 is a block diagram showing the circuit structure of an active matrix surface pressure input panel according to a fourth embodiment of the present invention.
Figure 7:
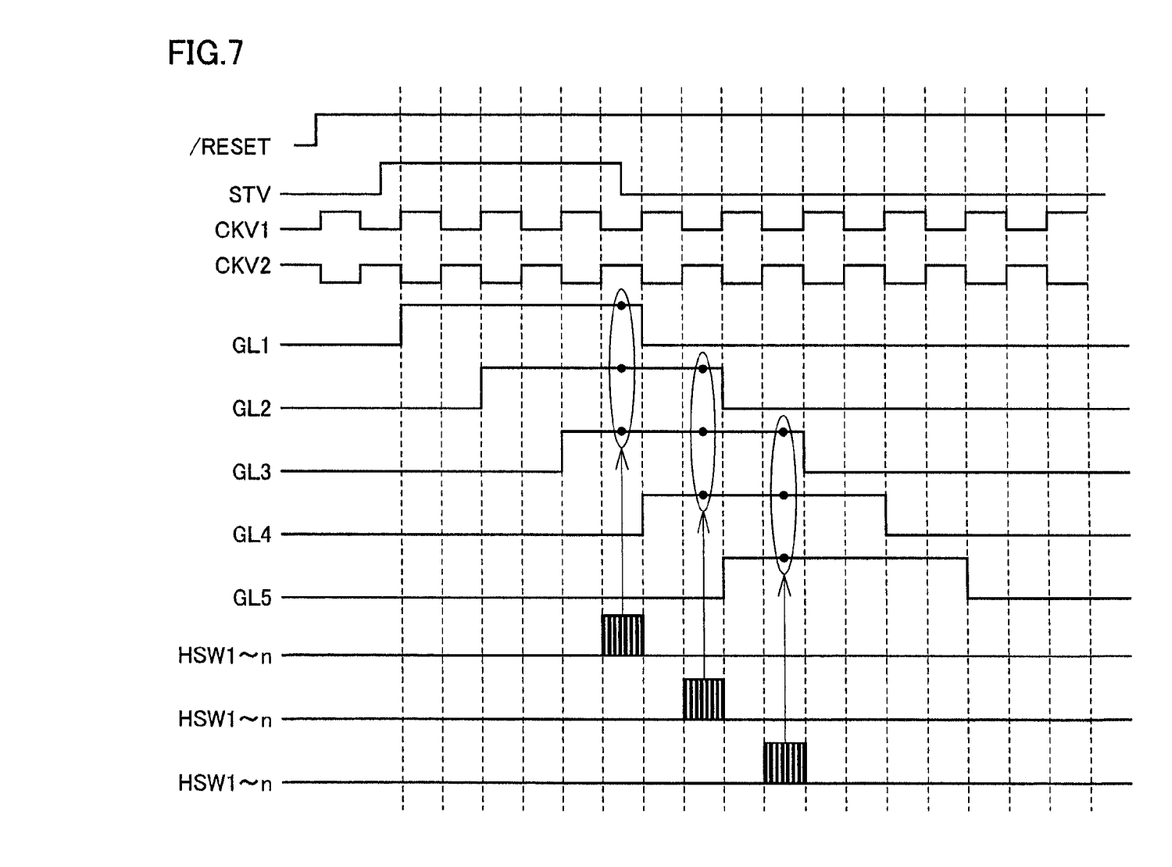
FIG. 7 is a timing chart for illustrating operations of the active matrix surface pressure input panel according to the fourth embodiment of the present invention.

Referring to FIGS. 6 and 7, a surface pressure input panel according to a fourth embodiment of the present invention has a single gate line driving circuit provided for a single gate line and a single H switch driving circuit provided for nine data lines. The surface pressure input panel according to the fourth embodiment is now described in detail.

According to the fourth embodiment, gate line driving circuits 32a, 32b an 32c are connected to gate lines GL1, GL2 and GL3 respectively, as shown in FIG. 6. An H switch driving circuit 31a is provided for data lines DL1 to DL9, and an H switch driving circuit 31b is provided for data lines DL10 to DL18. The data lines DL1 to DL9 are connected to data read lines SIG1 to SIG9 through switching transistors 3a to 3i consisting of polysilicon TFTs respectively, while the data lines DL10 to DL18 are connected to the data read lines SIG1 to SIG9 through switching transistors 3j to 3r consisting of N-channel polysilicon TFTs respectively.

A detection part D11 coupled with the gate line GL1 is connected to the data line DL1, a detection part D21 coupled with the gate line GL2 is connected to the data line DL2, and a detection part D31 coupled with the gate line GL3 is connected to the data line DL3. Similarly, the remaining detection parts coupled with the gate lines GL1, GL2 and GL3 are sequentially connected to corresponding data lines respectively.

In operations of the surface pressure input panel according to the fourth embodiment having the aforementioned structure, the H switch driving circuits 31a, 31b, ... operate from HSW1 to HSWn in periods shown by arrows respectively for reading data, as shown in FIG. 7. More specifically, the surface pressure input panel first planarly reads data from the gate lines GL1, GL2 and GL3. Then, the surface pressure input panel planarly reads data from the gate lines GL2, GL3 and GL4. Then, the surface pressure input panel planarly reads data from the gate lines GL3, GL4 and GL5. Thus, the data of the gate lines GL2, GL3 and GL4 are available subsequently to those of the gate lines GL1, GL2 and GL3. According to this data reading method, the data can be more continuously detected in data processing as compared with a case of reading data from the gate lines GL4, GL5 and GL6 after reading the data from the gate lines GL1, GL2 and GL3. Consequently, more smooth image data can be detected.

The aforementioned continuous data reading is enabled due to the provision of a single gate line driving circuit for a single gate line. When the single gate line driving circuit 22a is provided for the three gate lines GL1, GL2 and GL3 as in the third embodiment shown in FIG. 5, the data are read from the subsequent three gate lines GL4, GL5 and GL6 after the data coupled with the gate lines GL1, GL2 and GL3 are read. In the fourth embodiment shown in FIG. 6, on the other hand, single gate line driving circuits 32a, 32b, 32c, ... are provided for the single gate lines GL1, GL2, GL3 ... respectively, whereby the data can be read from the gate lines GL2, GL3 and GL4 after reading the data of the gate lines GL1, GL2 and GL3.

According to the fourth embodiment, further, a single H switch driving circuit is provided for nine data lines, whereby the number of elements of peripheral circuits can be further reduced as compared with the first embodiment provided with a single H switch driving circuit for four data lines.

Fifth Embodiment

Figure 8:
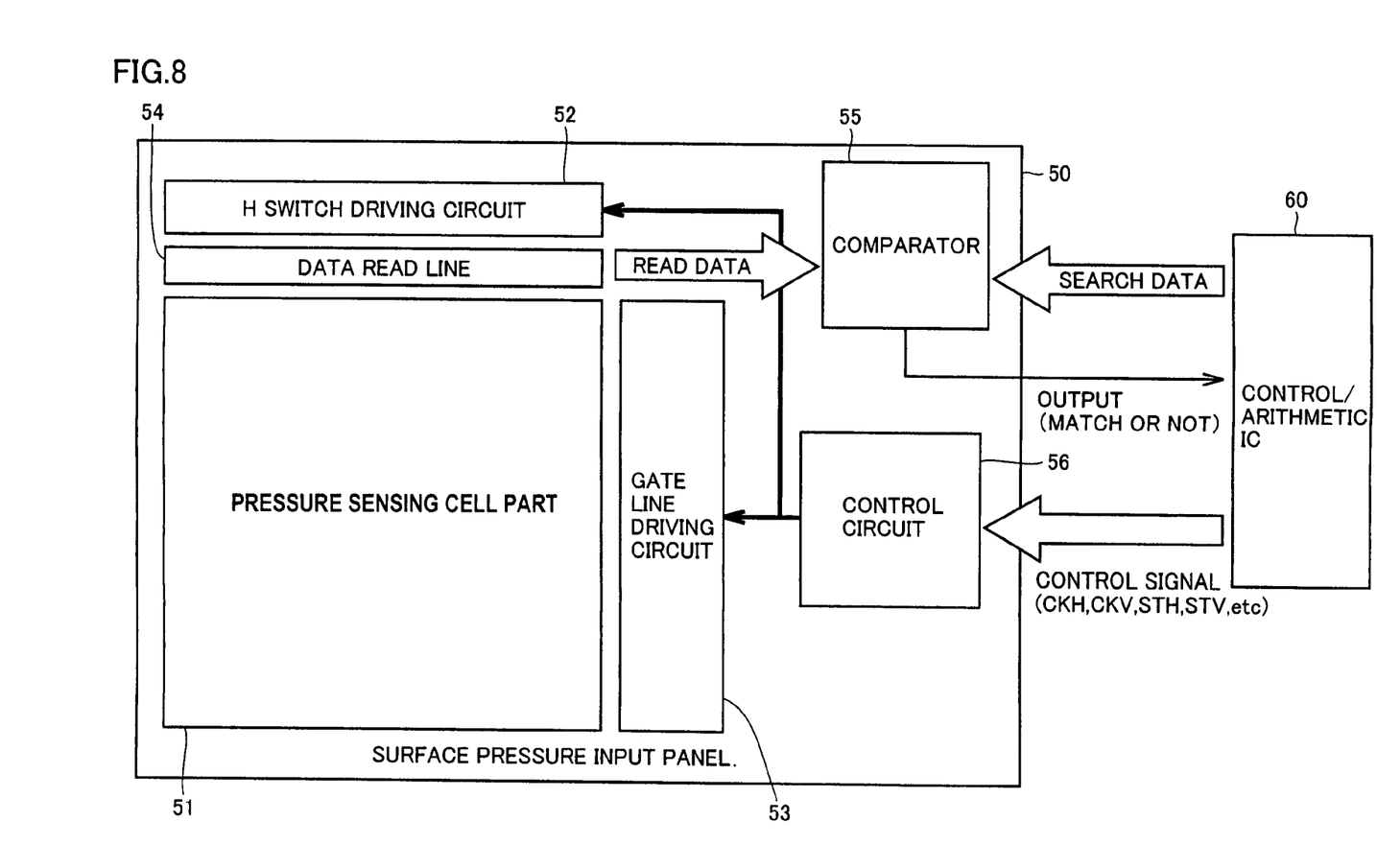
FIG. 8 is a plane layout diagram showing the overall structure of an active matrix surface pressure input panel according to a fifth embodiment of the present invention.

Referring to FIG. 8, a pressure sensing cell part 51 including a plurality of detection parts, an H switch driving circuit 52, a gate line driving circuit 53, a data read line 54, a comparator 55 and a control circuit 56 are formed on a surface pressure input panel 50 according to a fifth embodiment of the present invention. The pressure sensing cell part 51 including a plurality of detection parts, the H switch driving circuit 52, the gate line driving circuit 53 and the data read line 54 are in the circuit structure according to any of the aforementioned first to fourth embodiments.

The comparator 55 is a circuit for detecting match/mismatch between data read through the data read line 54 and data stored in a control/arithmetic IC 60.

According to the fifth embodiment, the pressure sensing cell part 51 including a plurality of detection parts, the H switch driving circuit 52 and the gate line driving circuit 53 are so formed on the same surface pressure input panel 50 that no driving signal may be externally fetched, and hence the surface pressure input panel 50 may be provided no electrode for external connection. Thus, an electrode area of the surface pressure input panel 50 may be eliminated, whereby the area of the pressure sensing cell part 51 can be increased in addition to the effect of reducing the number of elements necessary for peripheral circuits obtained by the circuit structure according to any of the aforementioned first to fourth embodiments. Consequently, data can be more precisely and definitely detected. No driving signal may be externally fetched through an electrode, whereby a step of externally connecting the electrode can be omitted and the fabrication steps can be consequently shortened. Further, reduction of the assembly yield resulting from the step of externally connecting the electrode can be prevented.

According to the fifth embodiment, further, the comparator 55 detecting match/mismatch between read data and the data stored in the control/arithmetic IC 60 is provided on the surface pressure input panel 50, whereby match/mismatch between read data and the data stored in the control/arithmetic IC 60 can be detected on the surface pressure input panel 50. Consequently, an interface between the external control/arithmetic IC 60 and the surface pressure input panel 50 can be simplified.

Although the present invention has been described and illustrated in detail, it is clearly understood that the same is by way of illustration and example only and is not to be taken by way of limitation, the spirit and scope of the present invention being limited only by the terms of the appended claims.

While each of the aforementioned embodiments has been described with reference to a surface pressure input panel employed as an exemplary signal detector, for example, the present invention is not restricted to this but is also widely applicable to other signal detectors such as a two-dimensional image sensor. When the present invention is applied to another signal detector, signal detection means specific to this signal detector may be employed in place of the pressure sensitive film serving as the signal detection means of the surface pressure input panel. For example, a photo-receiving sensor element may be employed as the signal detection means when the present invention is applied to a two-dimensional image sensor.

While the transfer transistor 4 forming the detection part and the switching transistors 3a to 3d are formed by N-channel polysilicon TFTs in each of the aforementioned embodiments, the present invention is not restricted to this but the transfer transistor 4 and the switching transistors 3a to 3d may alternatively be formed by thin-film transistors (TFT) made of an organic material or a composite material of organic and inorganic materials. In this case, αω-Dihexyl-hexathiophene, for example, may be employed as the organic material. Further, $(C_6H_5C_2H_4NH_3)_2SnI_4$, for example, may be employed as the composite material of organic and inorganic materials.

What is claimed is:

1. A signal detector comprising:
   a plurality of signal transfer transistors arranged in the form of a matrix;
   signal detection means connected to a first terminal of each said signal transfer transistor;
   a data line connected to a second terminal of each said signal transfer transistor;
   a control line connected to a control terminal of each said signal transfer transistor;
   a control line driving circuit for driving said control line;
   a plurality of switching transistors configured to couple a plurality of said data lines to a plurality of data read lines, respectively; and
   a switch driving circuit for driving said plurality of switching transistors at substantially the same time to enable data from said plurality of data lines to be read out in parallel to said plurality of data read lines, said switch driving circuit for providing said read data in parallel to a circuit for comparing said read data with reference data.

2. The signal detector according to claim 1, wherein a single said switch driving circuit is provided for said plurality of data lines.

3. The signal detector according to claim 2, wherein single said switch driving circuit is provided for four or nine said data lines.

4. The signal detector according to claim 2, wherein single said control line driving circuit is provided for a plurality of said control lines.

5. The signal detector according to claim 4, wherein single said switch driving circuit is provided for four said data lines, and
   single said control line driving circuit is provided for two said control lines.

6. The signal detector according to claim 4, wherein single said switch driving circuit is provided for nine said data lines, and
   single said control line driving circuit is provided for three said control lines.

7. The signal detector according to claim 4, wherein said plurality of control lines are simultaneously commissioned thereby planarly reading data.

8. The signal detector according to claim 1, wherein said switch driving circuit employs are pulse output to read data from said signal detection means in a time-division system.

9. The signal detector according to claim 1, wherein said switch driving circuit includes two shift registers, a NAND circuit and an inverter.

10. The signal detector according to clam 1, wherein said control line driving circuit includes a shift register.

11. The signal detector according to claim 1, wherein said signal transfer transistors and said switching transistors consist of polysilicon thin-film transistors.

12. The signal detector according to claim 1, wherein said signal transfer transistors and said switching transistors consist of thin-film transistors made of an organic material or a composite material of an organic material and an inorganic material.

13. The signal detector according to claim 1, wherein said signal detection means includes a pressure sensitive film.

14. The signal detector according to claim 1, wherein said signal detection means includes a photo-receiving sensor element.

15. The signal detector according to claim 1, wherein said plurality of signal transfer transistors, said signal detection means, said control line driving circuit and said switch driving circuit are provided on a common substrate.

16. The signal detector according to claim 15, wherein a comparator for comparing read data with stored data is also formed on said common substrate.

17. The signal detector according to claim 1, wherein said plurality of control lines include a first control line and a second control line,
   a plurality of said data lines include a first data line and a second data line,
   a plurality of said signal detection means include first signal detection means coupled with said first control line and said first data line and second signal detection means coupled with said second control line and said second data line, and
   said plurality of data read lines include a first data read line connected to said first data line and a second data read line connected to said second data line,
   said switch driving circuit includes a first switch driving circuit connected to said first data line and said second data line in common, and
   for simultaneously commissioning said first control line and said second control line while commissioning said first switch driving circuit thereby simultaneously reading data of said first signal detection means coupled with said first control line and data of said second signal detection means coupled with said second control line through said first data read line and said second data read line.

18. The signal detector according to claim 1, wherein said control line includes a first control line,
   a plurality of said data lines include a first data line and a second data line,
   a plurality of said signal detection means include first signal detection means and second signal detection means coupled with said first control line, said plurality of data read lines include a first data read line connected to said first data line and a second data read line connected to said second data line, and said switch driving circuit includes a first switch driving circuit connected to said first data line and said second data line in common, for commissioning said first control line and said first switch driving circuit thereby simultaneously reading data of said first signal detection means and said second signal detection means coupled with said first control line through said first data read line and said second data read line.

19. A signal detector comprising:

a plurality of transfer transistors arranged in the form of a matrix;

means connected to the source of each said transfer transistor for detecting the pressure of a surface;

a data line connected to the drain of each said transfer transistor;

a gate line connected to the gate of each said transfer transistor;

a gate line driving circuit for driving said gate line;

a plurality of switching transistors configured to couple a plurality of said data lines to a plurality of data read lines, respectively; and a single switch driving circuit for driving the gates of said plurality of switching transistors to enable data to be read out in parallel from said plurality of data lines to said plurality of data read lines, said switch driving circuit for providing said read data in parallel to a circuit for comparing said read data with reference data.

20. The signal detector according to claim 19, wherein said means detecting the pressure of a surface includes a pressure sensitive film.

21. A signal detector comprising:

a plurality of signal transfer transistors arranged in the form of a matrix;

signal detection means connected to a first terminal of each said signal transfer transistor;

a data line connected to a second terminal of each said signal transfer transistor;

a control line connected to a control terminal of each said signal transfer transistor;

a control line driving circuit for driving said control line;

a plurality of switching transistors configured to couple a plurality of said data lines to a plurality of data read lines, respectively; and a switch driving circuit for driving said plurality of switching transistors at substantially the same time to enable data from said plurality of data lines to be read out in parallel to said plurality of data read lines, wherein the switch driving circuit simultaneously provides a plurality of read data to a circuit for comparing said read data with reference data.

* * * * *